United States Patent
Panamarathupalayam et al.

(10) Patent No.: US 10,487,258 B2
(45) Date of Patent: Nov. 26, 2019

(54) SYNTHETIC POLYMER BASED FLUID LOSS PILL

(71) Applicant: M-I L.L.C., Houston, TX (US)

(72) Inventors: Balakrishnan Panamarathupalayam, Houston, TX (US); Richard Toomes, Houston, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 15/770,470

(22) PCT Filed: Oct. 28, 2016

(86) PCT No.: PCT/US2016/059318
§ 371 (c)(1),
(2) Date: Apr. 23, 2018

(87) PCT Pub. No.: WO2017/075348
PCT Pub. Date: May 4, 2017

(65) Prior Publication Data
US 2018/0312739 A1  Nov. 1, 2018

Related U.S. Application Data

(60) Provisional application No. 62/248,905, filed on Oct. 30, 2015.

(51) Int. Cl.
| | | |
|---|---|---|
| *E21B 43/26* | (2006.01) | |
| *C09K 8/508* | (2006.01) | |
| *C09K 8/12* | (2006.01) | |
| *C09K 8/512* | (2006.01) | |
| *C08F 26/10* | (2006.01) | |
| *C08L 39/06* | (2006.01) | |
| *C09K 8/516* | (2006.01) | |
| *C08F 220/56* | (2006.01) | |
| *C08F 220/58* | (2006.01) | |
| *C08L 33/26* | (2006.01) | |

(52) U.S. Cl.
CPC ............ *C09K 8/5086* (2013.01); *C08F 26/10* (2013.01); *C08L 39/06* (2013.01); *C09K 8/12* (2013.01); *C09K 8/512* (2013.01); *C09K 8/516* (2013.01); *C08F 220/56* (2013.01); *C08F 2220/585* (2013.01); *C08L 33/26* (2013.01); *E21B 43/26* (2013.01)

(58) Field of Classification Search
CPC ........ C09K 8/5086; C09K 8/12; C09K 8/516; C08F 26/10; C08F 220/56; C08F 2220/585; C08L 33/26
USPC .......................................................... 166/282
See application file for complete search history.

(56) References Cited

U.S. PATENT DOCUMENTS

| 10,017,906 | B2 * | 7/2018 | Szafert | C09K 17/40 |
|---|---|---|---|---|
| 2013/0319670 | A1 | 12/2013 | Lin et al. | |
| 2014/0076563 | A1 | 3/2014 | Lin et al. | |
| 2017/0145282 | A1 * | 5/2017 | Shumway | C09K 8/035 |
| 2017/0183560 | A1 * | 6/2017 | McDaniel | C09K 8/035 |

FOREIGN PATENT DOCUMENTS

| EP | 0668339 A1 | 8/1995 |
|---|---|---|
| WO | 2011/023967 A1 | 3/2011 |
| WO | 2015/034601 A1 | 3/2015 |

OTHER PUBLICATIONS

International Preliminary Report on Patentability for the equivalent International patent application PCT/US2016/059318 dated May 11, 2018.
Examination Report for the equivalent Australian patent application 2016343641 dated Aug. 15, 2018.
International Search Report and Written Opinion for the equivalent International patent application PCT/US2016/059318 dated Jan. 17, 2017.

\* cited by examiner

*Primary Examiner* — Silvana C Runyan
(74) *Attorney, Agent, or Firm* — David J. Smith

(57) ABSTRACT

Compositions herein may include an aqueous fluid, a crosslinked polyvinylpyrrolidone (PVP), and a betaine based polymer. Methods herein may include pumping a selected amount of a fluid loss pill into a formation, the fluid loss pill including a crosslinked PVP and a betaine based polymer.

23 Claims, No Drawings

SYNTHETIC POLYMER BASED FLUID LOSS PILL

BACKGROUND

During the drilling of a wellbore, various fluids are typically used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure, to prevent the ingress of formation fluids into the wellbore, to cool and lubricate the drill string and bit, and/or to maximize penetration rate.

For a drilling fluid to perform these functions and allow drilling to continue, the drilling fluid has to stay in the borehole. Frequently, undesirable formation conditions are encountered in which substantial amounts or, in some cases, the drilling fluid may be lost to the formation. Drilling fluid can leave the borehole through large or small fissures or fractures in the formation or through a highly porous rock matrix surrounding the borehole.

Lost circulation is a recurring drilling problem, characterized by loss of drilling mud into downhole formations. However, other fluids, besides "drilling fluid" can potentially be lost, including completion, drill-in, production fluid, etc. Lost circulation can occur naturally in formations that are fractured, highly permeable, porous, cavernous, or vugular. These earth formations can include shale, sands, gravel, shell beds, reef deposits, limestone, dolomite, and chalk, among others.

Providing effective fluid loss control without damaging formation permeability in completion operations has been a prime requirement for an ideal fluid loss-control pill. Conventional fluid loss control pills include oil-soluble resins, calcium carbonate, and graded salt fluid loss additives, which have been used with varying degrees of fluid loss control. These pills achieve their fluid loss control from the presence of solvent-specific solids that rely on filter-cake build up on the face of the formation to inhibit flow into and through the formation. However, these additive materials can cause severe damage to near-wellbore areas after their application. This damage can reduce production levels if the formation permeability is not restored to its original level. Further, at a suitable point in the completion operation, the filter cake is removed to restore the formation's permeability to its original level.

Use of such conventional fluid loss additives may result in long periods of clean-up after their use. Fluid circulation, which in some cases may not be achieved, may provide a high driving force, which allows diffusion to take place to help dissolve the concentrated build up of materials. Graded salt particulates can be removed by circulating unsaturated salt brine to dissolve the particles. In the case of a gravel pack operation, if this occurs before gravel packing, the circulating fluid often causes sloughing of the formation into the wellbore and yet further loss of fluids to the formation.

In addition, under HTHP conditions, polymeric materials used to viscosify wellbore fluids and provide a measure of fluid loss control may degrade, causing changes in the rheology of the fluid and may place additional strain on wellbore equipment. Exposure to HTHP conditions can have a detrimental effect on viscosifying agents, resulting in a loss in viscosity of the fluid at high temperatures. Specialized additives for HTHP conditions often contain polymeric materials that have exceptional resistance to extreme conditions, but can involve specialized cleanup fluids to remove. For example, many cellulose and cellulose derivatives used as viscosifiers and fluid loss control agents degrade at temperatures around 200° F. (93.3° C.) and higher. Hydroxyethyl cellulose (HEC), on the other hand, is considered sufficiently stable to be used in an environment of no more than about 225° F. (107.2° C.). Likewise, because of the high temperature, high shear, high pressures, and low pH to which well fluids are exposed, xanthan gum is considered stable to be used in an environment of no more than about 290 (143.3° C.) to 300° F. (148.8° C.). However, the thermal stability of polymers such as xanthan gum may also contribute to decreased well productivity. As a result, expensive and often corrosive breaker fluids have been designed to disrupt filter cakes and residues left by these polymers, but beyond costs, the breakers may also result in incomplete removal and may be hazardous or ineffective under HTHP conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition that includes an aqueous base fluid, a crosslinked polyvinylpyrrolidone (PVP) and a betaine based polymer.

In another aspect, embodiments of the present disclosure relate to a method for reducing fluid loss, the method including pumping a selected amount of a fluid loss pill into a formation, the fluid loss pill including an aqueous base fluid, a crosslinked polyvinylpyrrolidone (PVP) and a betaine based polymer.

In yet another aspect, embodiments of the present disclosure relate to a method for forming a fluid loss pill that includes forming a pre-mix of a crosslinked polyvinylpyrrolidone (PVP) and a glycol, mixing a desired amount of a first brine with the pre-mix, adding a second brine and adding at least a betaine based polymer.

DETAILED DESCRIPTION

Generally, embodiments disclosed herein relate to fluid loss pills, brine viscosifiers, fluid loss additives, and other methods of forming and using the same. More specifically, embodiments disclosed herein relate to compositions, such as fluid loss pills formed of an aqueous base fluid, a crosslinked polyvinylpyrrolidone (PVP) and a betaine based polymer. The inventors of the present disclosure have found that the combination of two gelling materials, namely a crosslinked PVP and a betaine based polymer may result in fluid loss pills that exhibit improved thermal stability, as well as viscosity and gel strength.

One of the components of the fluid loss pill of the present disclosure is a gelling material. Gelling materials suitable for use in the formulation of the fluid loss pill of the claimed subject matter may be selected from the group of crosslinked PVP polymers and betaine based polymers. The crosslinked PVP polymer may be added to an aqueous base fluid in accordance with the present disclosure to alter or maintain the rheological properties of the fluid, such as to maintain suspension properties for solids (including weighting material, bridging agents, or cuttings) or other components within the fluid. In some embodiments, crosslinked PVP polymers may include PVP homopolymers, copolymers, or block copolymers containing one or more PVP domains that have been crosslinked using various chemical reagents.

Crosslinked PVP polymers may include crosslinking via intramolecular covalent chemical bonds, which are not adversely affected by salt or pH conditions, as opposed to ionic bonds. The crosslinked PVP may have a percentage of intermolecular crosslinking that ranges from 0.25% to 10% in some embodiments, and from 0.5% to 5% in other embodiments.

In one embodiment, the crosslinked PVP polymer may be used at a concentration that ranges from a lower limit selected from the group of 0.5 lb/bbl (1.4 kg/m$^3$), 1 lb/bbl (2.8 kg/m$^3$), 2.5 lb/bbl (7.1 kg/m$^3$), and 3 lb/bbl (8.5 kg/m$^3$), to an upper limit selected from the group of 5 lb/bbl (14.2 kg/m$^3$), 10 lb/bbl (28.5 kg/m$^3$), 12 lb/bbl (34.2 kg/m$^3$), and 15 lb/bbl (42.7 kg/m$^3$), where the concentration may range from any lower limit to any upper limit. The amount used may vary depending upon the type of wellbore fluid, contamination, and temperature conditions.

According to the present embodiments, a mixture of at least two gelling materials may be used. In such embodiments, the mixture may include a crosslinked PVP polymer used in conjunction with a betaine based polymer which is not crosslinked. The inventors of the present disclosure have found that both types of polymers may interact, providing improved viscosification and fluid loss control properties to fluid loss pills. According to various embodiments, the ratio between the crosslinked PVP and the betaine based polymer may be from about 12 to 10 PVP to betaine.

In one or more embodiments, the betaine based polymer that has shown utility in the present disclosure is an acrylate derivative of betaine, such as a copolymer of 2-(methacryloyoxy) ethyl) dimethyl-(3-sulfopropyl) ammonium and polyacrylamide. In yet another embodiment, the betaine based polymer may have a content of the 2-(methacryloyoxy) ethyl) dimethyl-(3-sulfopropyl) ammonium ranging from about 8% to about 12%. In one or more embodiments, the betaine based polymer may be used in a range of about 5 to 20 pounds per barrel.

In various embodiments, the crosslinked PVP and/or the betaine based polymer may be dispersed in a non-aqueous solvent such as a glycol prior to addition to a base fluid to aid hydration and dispersion of the polymers. The amount of glycol to be applied in each pill may depend on the particular formation to be plugged to effectively control fluid loss. Solvents herein may be polyethers including, but not limited to, dipropylene glycol methyl ether, dipropylene glycol, tripropylene glycol, diethylene glycol monobutyl ether.

As noted above, the fluid loss pill may include an aqueous base fluid. The aqueous base fluid of the present disclosure may be water or brine. Brines are commonly used as wellbore fluids because of their wide density range, as well as for being substantially free of suspended solids. In addition, brines are often used in order to achieve a suitable density for use in well-drilling operations. One additional advantage of using brines is that brines typically do not damage certain types of downhole formations.

In those embodiments of the disclosure where the aqueous base fluid is a brine, the brine is water including an inorganic salt or an organic salt. The salt may serve to provide desired density (to balance against the formation pressures), and may also reduce the effect of the water based fluid on hydratable clays and shales encountered during drilling. In various embodiments, the brine may contain metal salts, such as, but not limited to, transition metal salts, alkali metal salts, alkaline earth metal salts, and mixtures thereof. In one or more embodiments the brine may be selected from the group of halide brines. For example, the brine may include zinc halides, calcium halides and mixtures thereof. In such embodiments, the brine may include zinc bromide or zinc chloride in combination with calcium bromide or calcium chloride. As noted above, the brine may also include an organic salt such as sodium, potassium or cesium formate. The brine solution may include the salts in conventional amounts, generally ranging from about 1% to about 80% based on the total weight of the solution, although as the skilled artisan will appreciate, amounts outside of this range may be used.

In various embodiments, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine including any one or more of those present in natural seawater or any other organic or inorganic dissolved salts.

Though the fluid loss control pill works at various brine concentrations, optimization of brine type and concentration may determine the performance of the fluid. In one embodiment, the brine solution may range from about 11.7 to about 15.4 ppg CaBr$_2$, and from about 14.3 to about 20.5 ppg ZnBr$_2$. It is also envisioned that other combinations of brines may be used.

In order to overcome the problems of formation damage associated with standard drilling fluids, a specialty fluid having a limited amount of solids and often degradable polymeric additives known as a reservoir drill-in fluid (RDF) may be used when drilling through the reservoir section of a wellbore. Particularly, RDFs may be formulated to minimize damage and maximize production of exposed zones. In some respects, an RDF may resemble a completion fluid. For example, drill-in fluids may be brines containing selected solids of appropriate particle size ranges (often removable salts such as calcium carbonate) and fluid loss additives. It is also envisioned that the formulations of the present disclosure may be used as reservoir drilling-in fluids, balancing the demands of the reservoir with drilling and completion processes.

The base fluid or wellbore fluid containing the base fluid may further contain other additives and chemicals that are known to be commonly used in oilfield applications by those skilled in the art. A variety of compounds are typically added to base fluids, such as brines. For example, a brine-based wellbore fluid may also include bridging solids, viscosifiers, corrosion inhibitors, lubricants, pH control additives, surfactants, solvents, wetting agents, weighting agents, pH control additives, and buffering agents among other additives.

In one or more embodiments, fluid loss pills disclosed herein may have bridging solids incorporated therein to bridge or block the pores of a subterranean formation. For example, useful bridging solids may be solid, particulate, acid soluble materials, the particles of which have been sized to have a particle size distribution sufficient to seal off the pores of the formations contacted by the fluid loss pill fluids. Examples of bridging solids may include calcium carbonate, limestone, marble, dolomite, iron carbonate, iron oxide, and the like. However, other solids may be used without departing from the scope of the present disclosure. In some embodiments of fluid loss pills disclosed herein, bridging solids may have a specific gravity less than about 3.0 and may be sufficiently acid soluble such that they readily decompose upon release of the organic acid.

In one or more embodiments, an amine stabilizer may be used as a pH buffer and/or thermal extender to prevent acid-catalyzed degradation of polymers present in the fluid. A suitable amine stabilizer may include triethanolamine. However, one skilled in the art would appreciate that other amine stabilizers such as methyldiethanol amine (MDEA), dimethylethanol amine (DMEA), diethanol amine (DEA), monoethanol amine (MEA), cyclic organic amines, sterically hindered amines, amides of fatty acid, or other suitable tertiary, secondary, and primary amines and ammonia could be used in the fluids of the present disclosure. Amine stabilizers may be added to a wellbore fluid in accordance with the present disclosure at a concentration that ranges from 0.1% to 10% by weight of the wellbore fluid in some embodiments, and from 0.5% to 5% by weight of the wellbore fluid in other embodiments. Further, is also envisioned that the fluid may be buffered to a desirable pH using, for example, magnesium oxide. The compound serves as to buffer the pH of the drilling fluid and thus maintain the alkaline conditions under which the process of hydrolysis or degradation of the polymers is retarded.

According to the present embodiments, fluid loss pills may be formulated by forming a pre-mix of a crosslinked PVP and a glycol, such as ethylene glycol. A desired amount of a first brine may be combined with the pre-mix, followed by the addition of a second brine. Afterwards, at least a betaine based polymer may be added to the mixture. For example, in one embodiment, a 11.7 to 15.4 ppg $CaBr_2$ brine may be viscosified using a crosslinked PVP in the presence of ethylene glycol. Next, a second brine, such as 19.2 ppg zinc bromide brine may be added in order to reach a desired density. Afterwards, a betaine based polymer may be added to reach the desired viscosity. In various embodiments, the fluid loss pills may possess high thermal stability, having particular application for use in environments of up to 400° F. (148.8° C.). In yet another embodiment, the fluid loss pills of the present disclosure may be thermally stable for at least 7 days. According to various embodiments, the fluid loss pill has a density ranging from about 13.5 ppg to about 16.5 ppg, where the lower limit can be any of 13.5 ppg, 15 ppg, 15.4 ppg and the upper limit can be any of 16 ppg, 16.2 ppg and 16.5 ppg, where any lower limit can be used with any upper limit.

One embodiment of the present disclosure involves a method for reducing fluid loss in a wellbore. In one such illustrative embodiment, the method involves pumping a selected amount of a fluid loss pill into a formation, the fluid loss pill including an aqueous base fluid, a crosslinked polyvinylpyrrolidone (PVP), and a betaine based polymer.

In various embodiments, the fluid loss pill may be injected into a work string, flow to bottom of the wellbore, and then out of the work string and into the annulus between the work string and the casing or wellbore. This batch of treatment is typically referred to as a "pill." The pill may be pushed by injection of other completion fluids behind the pill to a position within the wellbore which is immediately above a portion of the formation where fluid loss is suspected. The fluid loss pill may be selectively emplaced in the wellbore, for example, by spotting the pill through a coil tube or by bullheading. Injection of fluids into the wellbore is then stopped, and fluid loss will then move the pill toward the fluid loss location. Positioning the pill in a manner such as this is often referred to as "spotting" the pill. The fluid loss pill may then react with the brine to form a plug near the wellbore surface, to reduce fluid flow into the formation.

After completion of the drilling or completion process, filter cakes deposited by drilling and treatment fluids may be broken by application of a breaker fluid that degrades the constituents of the filter cake formed from drilling and/or a fluid loss pill. The breaker fluid may be circulated in the wellbore during or after the performance of the at least one completion operation. In other embodiments, the breaker fluid may be circulated either before, during, or after a completion operation has commenced to destroy the integrity of and clean up residual drilling fluids remaining inside casing or liners. The breaker fluid may contribute to the degradation and removal of the filter cake deposited on the sidewalls of the wellbore to minimize negatively impacting production. Upon cleanup of the well, the well may then be converted to production.

The breaker fluids of the present disclosure may also be fou ululated to contain an acid source to decrease the pH of the breaker fluid and aid in the degradation of filter cakes within the wellbore. Examples of acid sources that may be used as breaker fluid additives include strong mineral acids, such as hydrochloric acid or sulfuric acid, and organic acids, such as citric acid, salicylic acid, lactic acid, malic acid, acetic acid, and formic acid. Suitable organic acids that may be used as the acid sources may include citric acid, salicylic acid, glycolic acid, malic acid, maleic acid, fumaric acid, and homo- or copolymers of lactic acid and glycolic acid, as well as compounds containing hydroxy, phenoxy, carboxylic, hydroxycarboxylic or phenoxycarboxylic moieties. In one or more embodiments, before, during, or after a completion operation has started, or upon conclusion of the completion operations, the circulation of an acid wash may be used to at least partially dissolve some of the filter cake remaining on the wellbore walls.

Other embodiments may use breaker fluids that contain hydrolysable esters of organic acids and/or various oxidizers in combination with or in lieu of an acid wash. Hydrolysable esters that may hydrolyze to release an organic (or inorganic) acid may be used, including, for example, hydrolyzable esters of a $C_1$ to $C_6$ carboxylic acid and/or a $C_2$ to $C_{30}$ mono- or poly-alcohol, including alkyl orthoesters. In addition to these hydrolysable carboxylic esters, hydrolysable phosphonic or sulfonic esters could be utilized, such as, for example, $R^1H_2PO_3$, $R^1R^2HPO_3$, $R^1R^2R^3PO_3$, $R^1HSO_3$, $R^1R^2SO_3$, $R^1H_2PO_4$, $R^1R^2HPO_4$, $R^1R^2R^3PO_4$, $R^1HSO_4$, or $R^1R^2SO_4$, where $R^1$, $R^2$, and $R^3$ are $C_2$ to $C_{30}$ alkyl-, aryl-, arylalkyl-, or alkylaryl-groups. One example of a suitable hydrolysable ester of carboxylic acid is available from MI-SWACO (Houston, Tex.) under the name D-STRUCTOR.

In some instances, it may also be desirable to include an oxidant in the breaker fluid, to further aid in breaking or degradation of polymeric additives present in a filter cake. Examples of such oxidants may include any one of those oxidative breakers known in the art to react with polymers such as polysaccharides to reduce the viscosity of polysaccharide-thickened compositions or disrupt filter cakes. Such compounds may include peroxides (including peroxide adducts), other compounds including a peroxy bond such as persulphates, perborates, percarbonates, perphosphates, and persilicates, and other oxidizers such as hypochlorites. Further, use of an oxidant in a breaker fluid, in addition to affecting polymeric additives, may also cause fragmentation of swollen clays, such as those that cause bit balling.

It should be appreciated that the amount of delay between the time when a breaker fluid according to the present disclosure is introduced to a well and the time when the fluids have had the desired effect of breaking/degrading/dispersing the filter cake may depend on several variables. One of skill in the art should appreciate that factors such as the downhole temperature, concentration of the components in the breaker fluid, pH, amount of available water, filter cake composition, etc. may have an impact. For example downhole temperatures can vary considerably from 100° F. (37.7° C.) to over 400° F. (204.4° C.) depending upon the formation geology and downhole environment. However, one of skill in the art via trial and error testing in the lab should easily be able to determine and thus correlate downhole temperature and the time of efficacy for a given formulation of the breaker fluids disclosed herein. With such information one can predetermine the time period to shut-in a well given a specific downhole temperature and a specific formulation of the breaker fluid.

The superior thermal stability and performance of the fluid loss pills of this disclosure in controlling the fluid loss from the drilling fluid were determined by conducting the following tests.

Rheology Test

Viscosity is a measurement describing the flow properties of drilling fluids and their behavior while under influence of shear stress. Using a Fann 35 Viscometer, Fann 70 Viscometer, Grace Viscometer, the rheological parameters namely plastic viscosity (PV) and yield point (YP) are determined. One of skill in the art will appreciate that the viscosity measurements will be dependent upon the temperature of the gel composition, the type of spindle, and the number of revolutions per minute. Generally, increase in the plastic viscosity and yield point values are proportional to an increase of the drilling fluid density, but the yield point increases by a smaller magnitude.

Plastic Viscosity Test

Plastic viscosity (PV) is one variable used in the calculation of viscosity characteristics of a drilling fluid, measured in centipoise (cP) units. PV is the slope of the shear stress-shear rate plot above the yield point and is derived from the 600 rpm reading minus the 300 rpm reading. A low PV indicates that the mud is capable of drilling rapidly because of the low viscosity of mud exiting at the bit. High PV is caused by a viscous base fluid and by excess colloidal solids. To lower PV, a reduction in solids content may be achieved by dilution.

Yield Point Test

Yield point (YP) is another variable used in the calculation of viscosity characteristics of drilling fluids, measured in pounds per 100 feet square (lb/100 ft$^2$) (0.05 kg/m$^2$). The physical meaning of the Yield Point (YP) is the resistance to initial flow. YP is used to evaluate the ability of mud to lift cuttings out of the annulus. The Bingham plastic fluid plots as a straight line on a shear-rate (x-axis) versus shear stress (y-axis) plot, in which YP is the zero-shear-rate intercept (PV is the slope of the line). YP is calculated from 300 rpm and 600 rpm viscometer dial readings by subtracting PV from the 300 rpm dial reading and it is reported as lbf/100 ft$^2$. A higher YP implies that a drilling fluid has the ability to carry cuttings better than a fluid of similar density but lower YP.

Gel Strength Test

The gel strength (thixotropy) is the shear stress measured at low shear rate after a mud has set quiescently for a period of time (10 seconds and 10 minutes in the standard API procedure, although measurements after 30 minutes or 16 hours may also be made).

EXAMPLES

The following examples are presented to illustrate the preparation and properties of fluid loss pills and should not be construed to limit the scope of the disclosure, unless otherwise expressly indicated in the appended claims.

Example 1

A sample formulation was prepared as shown below in Table 1, using a crosslinked PVP, a betaine based polymer, ethylene glycol, sized calcium carbonate used as a bridging agent and a defoamer. Specifically, the crosslinked PVP was added to a premix containing $CaBr_2$/ethylene glycol/ECF-2122 and the mixture was sheared for 45 minutes. Afterwards, $ZnBr_2$ was added and the mixture was sheared for 30 minutes. Next, the betaine based polymer was added to the formulation, followed by shear for 1.5 hours.

The fluid loss pill was heat aged for 7 days at 265° F. (129.4° C.). After 7 days, the fluid loss pill exhibited the rheological properties as shown below in Table 1. The rheology of the fluid loss pill was tested using a Fann 35 Viscometer (Fann Instrument Company). In addition, the fluid loss pill was added over a filter cake to check its compatibility with a DIPRO based filter cake. In addition, gel strength, marked as "gel", was measured at a 10 second and then at a 10 minute interval, with a Fann 35 Viscometer set at 3 rpm.

TABLE 1

Fluid loss pill formulation and its thermal and rheological properties.

| Formulation | SG | lb/bbl | bbl/bbl |
|---|---|---|---|
| Crosslinked PVP | 1.10 | 12.0 | |
| Betaine based polymer | | 10.0 | |
| Ethylene glycol | 1.12 | 19.5 | |
| ECF-2122 | 1.00 | 0.35 | |
| Sized calcium carbonate | 2.80 | | |

| Base brine type | | $ZnBr_2/CaBr_2$ | |
|---|---|---|---|
| Base brine density | | 16.20 | |
| Water | | | |
| Dry $CaBr_2$ | | | |
| 14.7 $CaBr_2$ | | | |
| 14.6 $CaBr_2$ | | | |
| 14.2 $CaBr_2$ | | 318.12 | 0.533 |
| 15.4 $CaBr_2$ nanobrine | | | |
| 19.2 $ZnBr_2/CaBr_2$ | | 286.76 | 0.355 |
| Base brine | | 604.95 | 0.889 |
| Final system density | ppg | 15.40 | |

| Thermal | Units | 5-May | 13-May |
|---|---|---|---|
| Dynamic aging time | hrs | Initial | |
| Static aging time | hrs | | 7 day |
| Aging temperature | F. | | |
| Type (D or S) | Dyn/static | | |

| Rheology/Temperature | F. | 120 F. (fresh fluid) | 120 F. (aged for 7 days at 265° F.) |
|---|---|---|---|
| 600 | rpm | >330 | 125 |
| 300 | rpm | 265 | 93 |

TABLE 1-continued

Fluid loss pill formulation and its thermal and rheological properties.

| 200 | rpm | 209 | 79 |
| 100 | rpm | 137 | 61 |
| 6 | rpm | 21 | 22 |
| 3 | rpm | 14 | 17 |
| Gel 10 s | lbs/100ft² | 14 | 18 |
| Gel 10 min | lbs/100ft² | 25 | 20 |
| PV | cP | | 32 |
| YP | lbs/100ft² | | 61 |

Advantageously, embodiments of the present disclosure provide fluid loss pills and associated methods using such fluids that include a crosslinked PVP and a betaine based polymer. The fluid loss pill of the present disclosure may advantageously be thermally stable for at least 7 days to temperatures to up to 400° F., whereas use of conventional fluid loss pills may begin to experience degradation at lower temperatures. Additionally, use of fluid loss pills containing a crosslinked PVP and a betaine based polymer has a synergistic effect on the rheological properties of the fluid loss pill, such a superior viscosity and gel strength properties.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A composition comprising:
    an aqueous base fluid;
    a crosslinked polyvinylpyrrolidone (PVP); and
    a betaine based polymer, wherein the betaine based polymer is a copolymer of 2-(methacryloyoxy) ethyl) dimethyl-(3-sulfopropyl) ammonium and polyacrylamide, and
    wherein the betaine based polymer has a content of 2-(methacryloyoxy) ethyl) dimethyl-(3-sulfopropyl) ammonium ranging from about 8% to about 12%.

2. The composition of claim 1, wherein the aqueous base fluid is a halide brine.

3. The composition of claim 1, wherein the aqueous base fluid is a formate brine.

4. The composition of claim 1, wherein the crosslinked PVP is present in the composition at a concentration that ranges from about 0.5 lb/bbl (1.4 kg/m³) to about 15 lb/bbl (42.7 kg/m³).

5. The composition of claim 1, wherein a ratio between the crosslinked PVP and the betaine based polymer is 12 to 10.

6. The composition of claim 1, wherein the crosslinked PVP has a percentage of intermolecular crosslinking that ranges from 0.25% to 10%.

7. The composition of claim 1, wherein the fluid loss pill is thermally stable to temperatures up to 400° F.

8. The composition of claim 1, wherein the fluid loss pill is thermally stable for at least 7 days.

9. The composition of claim 1, wherein the fluid loss pill has a density of about 13.5 ppg to about 16.5 ppg.

10. A method for reducing fluid loss, the method comprising:
    pumping a selected amount of a fluid loss pill into a formation, the fluid loss pill comprising:
        an aqueous base fluid;
        a crosslinked polyvinylpyrrolidone (PVP); and
        a betaine based polymer, wherein the betaine based polymer is a copolymer of 2-(methacryloyoxy) ethyl) dimethyl-(3-sulfopropyl) ammonium and polyacrylamide, and
        wherein the betaine based polymer has a content of 2-(methacryloyoxy) ethyl) dimethyl-(3-sulfopropyl) ammonium ranging from about 8% to about 12%.

11. The method of claim 10, wherein the aqueous base fluid comprises at least a brine selected from a group of halide brines.

12. The method of claim 10, wherein the aqueous base fluid comprises at least a brine selected from a group of formate brines.

13. The method of claim 10, wherein the crosslinked PVP is present in the fluid loss pill at a concentration that ranges from about 0.5 lb/bbl (1.4 kg/m³) to about 15 lb/bbl (42.7 kg/m³).

14. The method of claim 10, wherein a ratio between the crosslinked PVP and the betaine based polymer is 12 to 10.

15. The method of claim 10, wherein the crosslinked PVP has a percentage of intermolecular crosslinking that ranges from 0.25% to 10%.

16. The method of claim 10, wherein the fluid loss pill is thermally stable to temperatures up to 400° F.

17. The method of claim 10, wherein the fluid loss pill is thermally stable for at least 7 days.

18. The method of claim 10, wherein the pill has a density of about 13.5 ppg to about 16.5 ppg.

19. A method for forming a fluid loss pill, the method comprising:
    forming a pre-mix of a crosslinked polyvinylpyrrolidone (PVP) and a glycol;
    mixing a desired amount of a first brine with the pre-mix;
    adding a second brine; and
    adding at least a betaine based polymer,
    wherein the betaine based polymer is a copolymer of 2-(methacryloyoxy) ethyl) dimethyl-(3-sulfopropyl) ammonium and polyacrylamide, and
    wherein the betaine based polymer has a content of 2-(methacryloyoxy) ethyl) dimethyl-(3-sulfopropyl) ammonium ranging from about 8% to about 12%.

20. The method of claim 19, wherein the pill has a density of about 13.5 ppg to about 16.5 ppg.

21. The method of claim 19, wherein the crosslinked PVP has a percentage of intermolecular crosslinking that ranges from 0.25% to 10%.

22. The method of claim 19, wherein the fluid loss pill is thermally stable to temperatures up to 400° F.

23. The method of claim 19, wherein the fluid loss pill is thermally stable for at least 7 days.

* * * * *